United States Patent
Lau et al.

(10) Patent No.: US 10,757,466 B2
(45) Date of Patent: Aug. 25, 2020

(54) MULTIMODE SYNCHRONOUS RENDERING OF AUDIO AND VIDEO

(71) Applicant: DTS, Inc., Calabasas, CA (US)

(72) Inventors: Dannie Lau, Los Angeles, CA (US); Chunho Lee, La Cresenta, CA (US)

(73) Assignee: DTS, Inc., Calabasas, CA (US)

( * ) Notice: Subject to any disclaimer, the term of this patent is extended or adjusted under 35 U.S.C. 154(b) by 9 days.

(21) Appl. No.: 16/189,719

(22) Filed: Nov. 13, 2018

(65) Prior Publication Data

US 2019/0149874 A1    May 16, 2019

Related U.S. Application Data

(63) Continuation of application No. 15/265,609, filed on Sep. 14, 2016, now Pat. No. 10,158,905.

(51) Int. Cl.
| | |
|---|---|
| *H04N 21/43* | (2011.01) |
| *H04N 21/439* | (2011.01) |
| *H04N 21/44* | (2011.01) |
| *H04N 5/04* | (2006.01) |
| *H04N 21/262* | (2011.01) |
| *H04N 21/41* | (2011.01) |
| *H04N 21/414* | (2011.01) |
| *H04N 21/436* | (2011.01) |

(Continued)

(52) U.S. Cl.
CPC .......... *H04N 21/4302* (2013.01); *H04N 5/04* (2013.01); *H04N 21/2625* (2013.01); *H04N 21/26233* (2013.01); *H04N 21/4126* (2013.01); *H04N 21/41407* (2013.01); *H04N 21/4305* (2013.01); *H04N 21/4307* (2013.01); *H04N 21/4398* (2013.01); *H04N 21/43615* (2013.01); *H04N 21/43637* (2013.01); *H04N 21/44004* (2013.01); *H04N 21/64738* (2013.01); *H04N 21/64792* (2013.01); *H04N 21/8106* (2013.01); *H04N 21/8547* (2013.01)

(58) Field of Classification Search
CPC ....................................... H04N 21/4302–4307
See application file for complete search history.

(56) References Cited

U.S. PATENT DOCUMENTS

| | | | |
|---|---|---|---|
| 7,827,289 B2 | 11/2010 | Bucher et al. | |
| 7,852,416 B2 | 12/2010 | Bennett et al. | |

(Continued)

FOREIGN PATENT DOCUMENTS

| | | |
|---|---|---|
| EP | 1793570 | 6/2007 |
| EP | 1793592 | 6/2007 |

(Continued)

OTHER PUBLICATIONS

Audio, Android Open Source Project, https://source.android.com/devices/audio/index.html, printed on Apr. 5, 2016, in 2 pages.

(Continued)

*Primary Examiner* — Robert J Hance
(74) *Attorney, Agent, or Firm* — Knobbe Martens Olson & Bear LLP

(57) ABSTRACT

Media is selected for video playback through a first device and audio playback through one or more separate devices connected through a wireless network. Different techniques for synchronizing the audio and video can be selected based on one or more factors to improve media playback.

19 Claims, 12 Drawing Sheets

(51) Int. Cl.
*H04N 21/4363* (2011.01)
*H04N 21/647* (2011.01)
*H04N 21/81* (2011.01)
*H04N 21/8547* (2011.01)

(56) References Cited

U.S. PATENT DOCUMENTS

| | | | |
|---|---|---|---|
| 8,505,054 B1* | 8/2013 | Kirley | H04N 21/436 |
| | | | 725/74 |
| 8,918,822 B2 | 10/2014 | Varoglu et al. | |
| 9,237,324 B2 | 1/2016 | Lee et al. | |
| 10,080,061 B1* | 9/2018 | Kirley | H04N 21/43637 |
| 2006/0072399 A1* | 4/2006 | Fujimoto | G11B 27/034 |
| | | | 369/47.1 |
| 2006/0168524 A1* | 7/2006 | Saeki | G11B 27/10 |
| | | | 715/728 |
| 2007/0124765 A1 | 5/2007 | Bennett et al. | |
| 2007/0124792 A1 | 5/2007 | Bennett et al. | |
| 2007/0136769 A1 | 6/2007 | Goldberg et al. | |
| 2008/0201751 A1* | 8/2008 | Ahmed | H04N 21/4312 |
| | | | 725/109 |
| 2009/0060446 A1* | 3/2009 | Holden | H04N 21/4135 |
| | | | 386/356 |
| 2010/0046639 A1 | 2/2010 | Bennett | |
| 2010/0295993 A1* | 11/2010 | Oh | H04N 21/2368 |
| | | | 348/516 |
| 2011/0115988 A1* | 5/2011 | Chang | H04N 21/4126 |
| | | | 348/738 |
| 2012/0106920 A1* | 5/2012 | Fitzsimmons | H04N 5/783 |
| | | | 386/230 |
| 2012/0200772 A1 | 8/2012 | Minagawa et al. | |
| 2012/0308032 A1 | 12/2012 | Ginn et al. | |
| 2014/0010515 A1* | 1/2014 | Lee | H04L 65/605 |
| | | | 386/207 |
| 2014/0040958 A1 | 2/2014 | Bennett et al. | |
| 2014/0064511 A1 | 3/2014 | Desai | |
| 2014/0376873 A1* | 12/2014 | Tanaka | H04N 5/4403 |
| | | | 386/203 |
| 2015/0208161 A1* | 7/2015 | Lesaffre | H04N 21/4126 |
| | | | 381/74 |
| 2015/0281830 A1 | 10/2015 | Gauger, Jr. et al. | |
| 2015/0296047 A1 | 10/2015 | Ghazisaidi | |
| 2016/0028925 A1* | 1/2016 | Fischer | H04N 21/43637 |
| | | | 348/521 |
| 2016/0165276 A1 | 6/2016 | Toma et al. | |

FOREIGN PATENT DOCUMENTS

| | | |
|---|---|---|
| EP | 1804496 | 7/2007 |
| EP | 2063662 | 5/2009 |
| KR | 10-2006-0132412 | 12/2006 |
| WO | WO 2009/032492 | 3/2009 |

OTHER PUBLICATIONS

International Search Report and Written Opinion for application No. PCT/US2017/051095, dated Jun. 12, 2017, in 18 pages.
RFC 5109, RTP Payload Format for Generic FEC, Dec. 2007.

* cited by examiner

MULTIMODE SYNCHRONOUS RENDERING OF AUDIO AND VIDEO

INCORPORATION BY REFERENCE TO ANY PRIORITY APPLICATIONS

Any and all applications, if any, for which a foreign or domestic priority claim can be identified in the Application Data Sheet of the present application is hereby incorporated by reference under 37 CFR 1.57.

BACKGROUND

Network systems can have a variety of connected devices, such as computers, smartphones, tablets, televisions, and the like. A device connected to the network can play media. For example, a computer on a network can download media from the Internet to display a video through a display and output audio through speakers or headphones. Recently, smart televisions have become available with built-in networking functionality that enables media to be streamed directly to a television. Despite this and other advances, effective options for listening to television audio are still limited to wired speakers.

SUMMARY

One aspect features a method for selecting a mode of synchronizing audio playback between a first electronic device and a second electronic device. The method includes receiving, at a first electronic device, video data and audio data, the first electronic device comprising a television or media source coupled with a television; wirelessly transmitting clock information associated with the first electronic device through a wireless network to the second electronic device to establish synchronized clocks between the first and second electronic devices, the second electronic device being a mobile device; programmatically selecting, using a hardware processor of the first electronic device, an audio synchronization mode based at least in part on the video data, wherein the audio synchronization mode is selected between a first mode comprising delaying the video if the video data is below a threshold in size and a second mode comprising compressing the audio data if the video data is above the threshold in size; and transmitting the audio data from the first electronic device to the second electronic device according to the selected audio synchronization mode.

One aspect features a system for selecting a mode of synchronizing audio playback between a first electronic device and a second electronic device. The system comprises a first electronic device that comprises: memory comprising processor-executable instructions; a hardware processor configured to execute the processor-executable instructions; and a wireless transmitter in communication with the hardware processor. The processor-executable instructions are configured to: receive video data and audio data; cause the wireless transmitter to wirelessly transmit clock information associated with the first electronic device through a wireless network to a second electronic device to establish synchronized clocks between the first and second electronic devices; programmatically select an audio synchronization mode based at least in part on one or more of the video data, a buffer characteristic, and a network characteristic; and cause the wireless transmitter to transmit the audio data from the first electronic device to the second electronic device according to the selected audio synchronization mode.

One aspect features nontransitory physical electronic storage comprising processor-executable instructions stored thereon that, when executed by a processor, are configured to implement a system for selecting a mode of synchronizing audio playback between a first electronic device and a second electronic device. The system is configured to: receive audio data associated with a video at a first electronic device; wirelessly transmit clock information associated with the first electronic device through a wireless network to a second electronic device to establish synchronized clocks between the first and second electronic devices; programmatically select an audio synchronization mode based at least in part on one or more video or network characteristics; and transmit the audio data from the first electronic device to the second electronic device according to the selected audio synchronization mode.

For purposes of summarizing the disclosure, certain aspects, advantages, and novel features of the inventions have been described herein. It is to be understood that not necessarily all such advantages can be achieved in accordance with any particular embodiment of the invention. Thus, the invention can be embodied or carried out in a manner that achieves or optimizes one advantage or group of advantages as taught herein without necessarily achieving other advantages as can be taught or suggested herein.

DETAILED DESCRIPTION

Introduction

Figure 1:
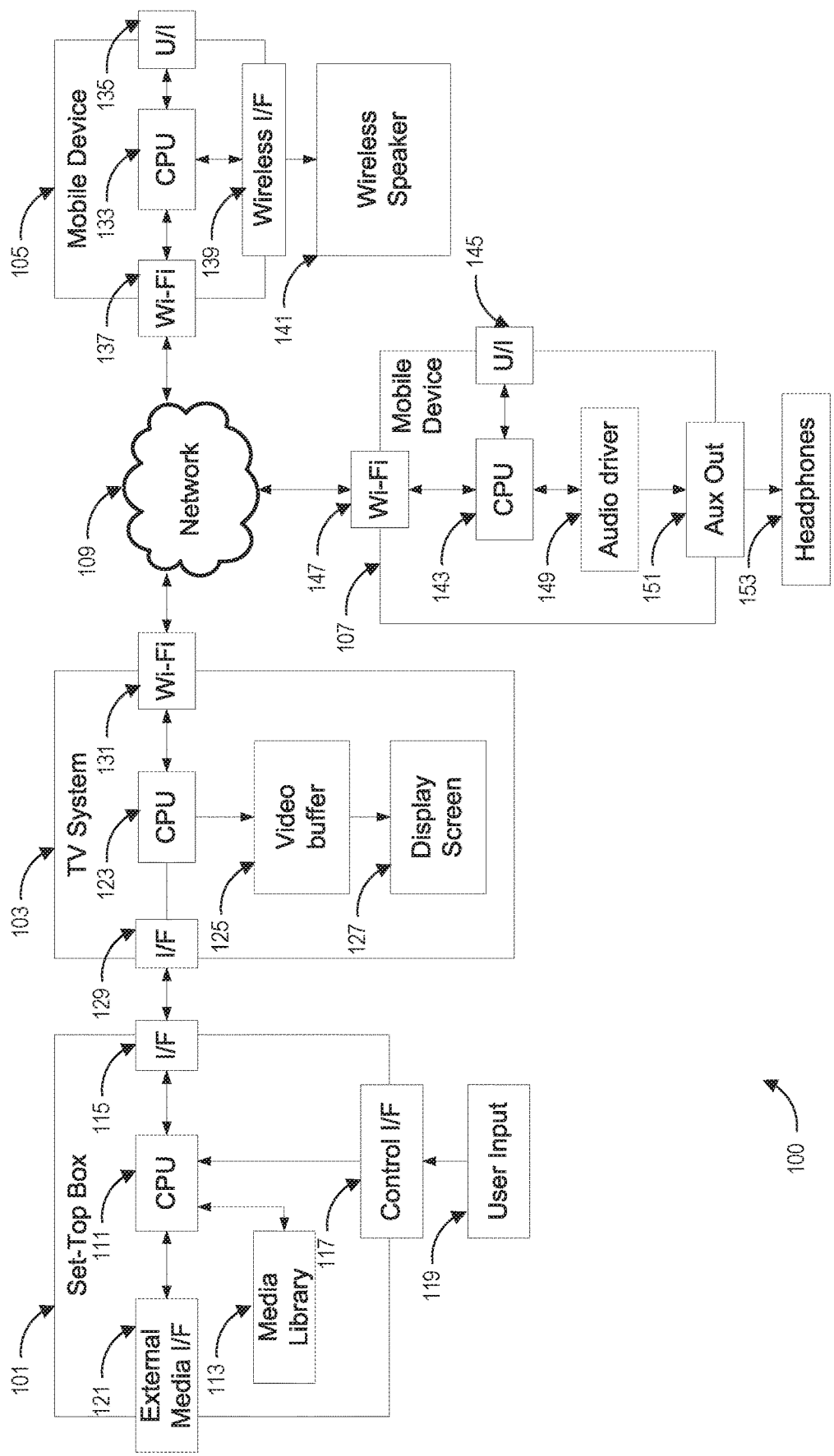
FIG. 1 shows an example system configured for synchronous media playback between a video device and two audio devices.

Although televisions typically include built-in speakers for rendering audio, some viewers wish to watch television while listening to the audio over wireless headphones. Bluetooth wireless headphones are available for this purpose, but the Bluetooth protocol is unsatisfactory because Bluetooth wireless headphones are often out of sync with television video. Viewers are thus subjected to the undesirable experience of listening to dialogue and other audio disconnected from their timely occurrence in the corresponding video. Consequently, Bluetooth headphones are disfavored by consumers.

Unfortunately, using the WiFi protocols (e.g., IEEE 802.11x) to transmit television audio has not adequately solved this synchronization problem. A major reason for this is that the wireless protocols are asynchronous. The media source and audio receiver may use separate clocks, and their respective clock signals may be out of sync or drift apart during the playback of media files. Further, wireless network performance, including latency levels, can vary so that audio data is more or less unpredictably delayed.

Certain embodiments of this disclosure describe improved synchronization techniques for synchronizing video on one device (e.g., a television (TV)) with corresponding audio played on another device (e.g., a phone or tablet). For example, through headphones connected to a mobile device, listeners can listen to audio that is properly (or approximately) synchronized with the corresponding video played on a TV. The television, or more generally, any media source (such as a set-top box or computer), can perform synchronization with a mobile application installed on the mobile device. Accordingly, some or all of the problems encountered by users of Bluetooth headphones may be overcome.

Moreover, because synchronization may be accomplished using a mobile device, the media source can provide the desired audio to different listeners by wirelessly sending individual audio streams to each listener's mobile device. This way, each listener can listen through separate headphones and adjust individual audio settings, such as volume or equalization (e.g., bass versus treble balance).

In some embodiments, the systems and methods described herein can perform synchronous playback by selecting from at least two different modes: a deterministic mode and a semi-isochronous mode. The deterministic mode can include, among other features, delaying the video and playing back the audio on the mobile device based on this known delay. The semi-isochronous mode, which may be used when deterministic processing is unavailable or based on other criteria, can include compressing the audio—even using lossy compression techniques—to enable the audio to be transmitted as fast as possible. These playback modes can be selected from based on one or more factors, such as hardware buffering capabilities, network performance, or the type of media being played. Various clock synchronization, buffering, clock-drift correction, and data processing methods can also be employed to improve synchronization.

Figure 2:
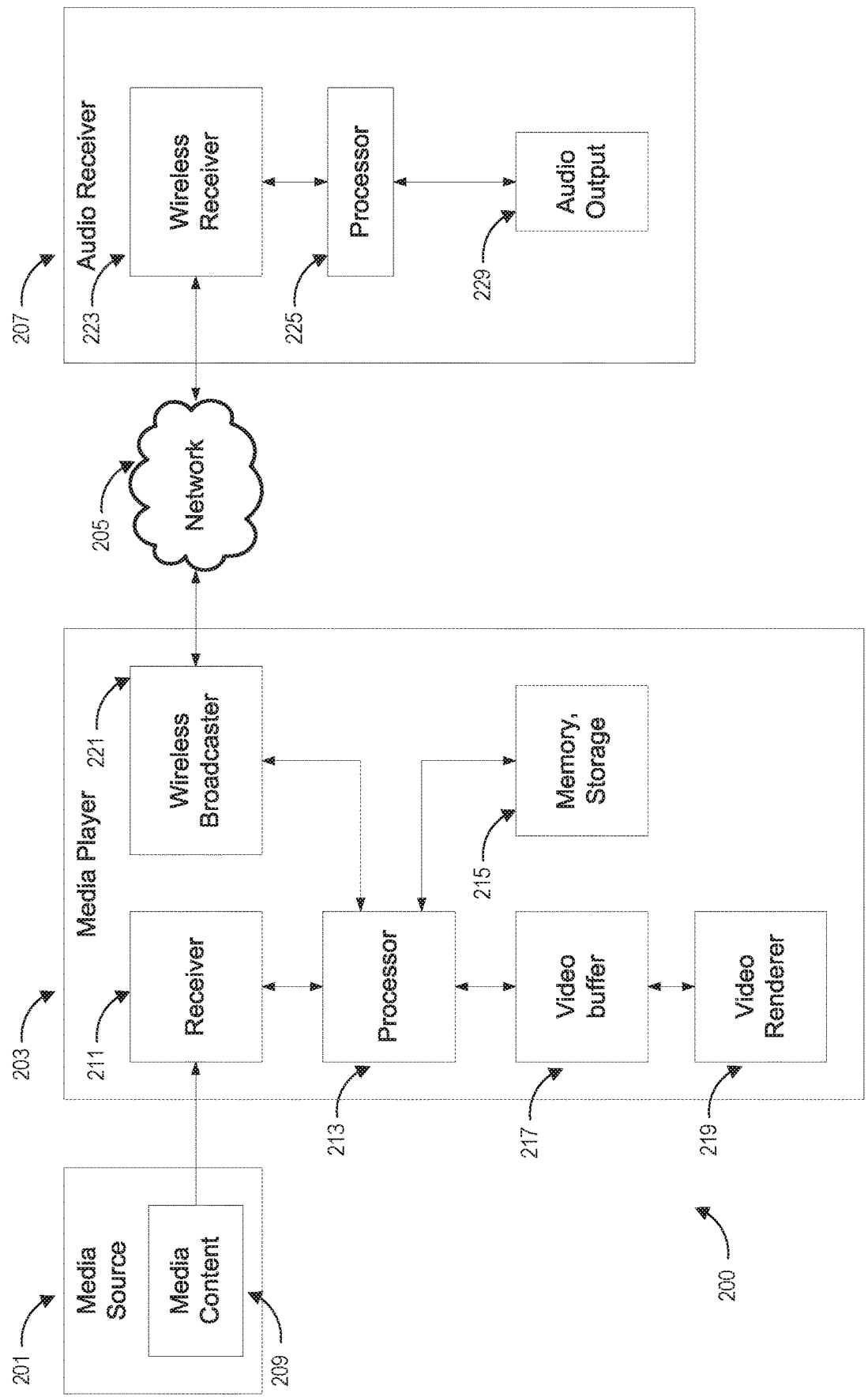
FIG. 2 shows an example system configured for synchronous media playback between a video device and an audio device.

Although a number of the following examples are described for convenience in terms of a TV and a smartphone (see, e.g., FIG. 1), it should be realized that the concepts extend to media sources and audio receivers generally (see, e.g., FIG. 2). Further, as used herein, the term "synchronization" and its derivatives, in addition to having their ordinary meaning, refer to actual or approximate synchronization. While the described systems and methods can achieve better synchronization than existing systems, a small delay between video and audio may be present, yet unnoticeable to a listener. Thus, "synchronization," as described herein, can include approximate synchronization with an imperceptible delay. Due to network conditions, even this synchronization may have a small delay that is user-perceptible in some instances, but the delay may be generally less intrusive than that achieved by currently-available systems.

Example System in Detail

FIGS. 1 and 2 provide an overview of example systems that can implement the synchronization features introduced above. Subsequent Figures, FIGS. 3-10, describe embodiments of synchronization processing that may be implemented in systems such as shown in FIGS. 1 and 2.

FIG. 1 shows an example system 100 configured for synchronous media playback between a video device and two audio devices, which can implement any of the methods described herein. The system 100 includes a set-top box 101, a television system 103, a mobile device 105, a mobile device 107, and a network 109, which may be a wireless local area network or portion of a wide area network.

The set-top box 101 includes a processor 111, media library 113, an interface 115, a control interface 117, and an external media interface 121 for receiving user input 119. The TV system includes a processor 123, a video buffer 125, a display screen 127, an interface 129, and a Wi-Fi transceiver 131. The first phone includes a processor 133, a user interface 135, a Wi-Fi transceiver 137, and a wireless transmitter 139 for transmitting to a wireless speaker 141 (optionally, a wired speaker or headphones may be used). The second phone includes a processor 143, a user interface 145, a Wi-Fi transceiver 147, an audio driver 149, and an auxiliary output 151 that can output audio to headphones 153.

The set-top box 101 provides a source of media, such as a movie, video clip, video stream, or video game. The media can be received through an external media interface 121. External media interface 121 can be a coaxial connection, an HDMI connection, a DVI connection, a VGA connection, a component connection, a cable connection, an Ethernet connection, wireless connection, or the like that connects to the Internet, a game console, a computer, a cable provider, a broadcaster, or the like. Alternatively, the set-top box 101 can have a local media library 113 stored in a local computer-readable storage medium, such as a hard disk or Blu-ray® disk (not shown).

A user can make provide user input 119 using a remote control, smartphone, or other device through the control interface 117. One or more processors 111 in the set-top box can process the user input to communicate selected media information through an interface 115 to the TV system. The interface 115 can be a coaxial connection, an HDMI connection, a DVI connection, a VGA connection, a component connection, a cable connection, an Ethernet connection, a bus, or the like that connects to the interface 129 on the TV system.

The TV system 103 receives, through interface 129, the media for playback (in other embodiments, the TV system is the media source). One or more processors 123 can process the media to handle the audio data and the video data. The video data may be buffered in the video buffer 125 and then rendered in the display screen 127. However, the video buffering duration and whether or not to buffer the video at all can be implemented according to the methods described herein. The audio data can be transmitted via the Wi-Fi connection 131 of the TV system 103 through the network 109 to a Wi-Fi connection 137 on a mobile device 105 and a Wi-Fi connection 147 on a mobile device 107. The same or different audio data can be transmitted to the two mobile devices 105, 107. In some embodiments, the same audio data can be transmitted to the two mobile devices 105, 107, and then the two devices 105, 107 can individually make adjustments to audio parameters such as volume or equalization (e.g., bass/treble balance or more detailed multi-band analysis). In some embodiments, the TV system 103 can send different language audio data to the two devices 105, 107, such as English audio to the mobile device 105 and Spanish audio to the mobile device 107. In some embodiments, one or both of the mobile devices 105, 107 can output enhanced narration for the blind, personally processed audio, or locally stored audio data or enhancements.

The mobile device 105 receives audio data through the Wi-Fi connection 137. The audio data is processed by the one or more processors 133 and rendered for output through a wireless interface 139 to be played through wireless speakers 141. A user interface 135 of the mobile device 105 allows a user to interact with the system 100. For example, the user can use an application on the device 105 to select media content to play; issue playback commands such as start, stop, fast forward, skip forward, and rewind; or otherwise interact with the set-top box 101, TV system 103, or mobile device 105. In some embodiments, the user interface can be used to select local media on the device 105 to be played by other devices on the network 109, such as by the TV system 103.

The mobile device 107 receives audio data through the Wi-Fi connection 147. The audio data is processed by the one or more processors 143 and driven through an audio driver 149 for playback through headphones 153 connected to an auxiliary output port 151 of the second phone. A user interface 145 of the mobile device 107 allows a user to interact with the system 100.

In various embodiments, the audio data received by the mobile device 107 can be the same as or different from the audio data received by the mobile device 105. When the audio data received by the mobile device 105 and the mobile device 107 is the same, the system may act in a broadcast or multicast configuration.

A More General Example System

FIG. 2 shows an example system 200 configured for synchronous media playback between a video device and an audio device, which can implement any of the methods described herein. The system includes a media source 201 and a media player 203 connected through network 205 to audio receiver 207. The media source 201 includes media content 209. The media player 203 includes a receiver 211, one or more processors 213, memory, storage, or both memory and storage devices 215, a video buffer 217, a video renderer 219, and a wireless broadcaster 221. The audio receiver 207 includes a wireless receiver 223, a processor 225, memory, storage, or both memory and storage devices 227, and an audio output 229.

The media source 201 provides the media content 209 to the media player 203. The media source 201 can be a set-top box (e.g., satellite or cable), a cable box, a television, a smart television, an Internet provider, broadcaster, a smartphone, media stick (e.g., Google Chromecast™ or the like), a media player (e.g., a Roku™ device or the like), a video game console, a Blu-ray® player, another computer, media server, antenna, combinations of the same, or the like. In some embodiments, the media source 201 can be a part of the media player 203, such as a locally stored media library in a hard drive of the media player 203, or the media source 201 can be the media player 203.

The media player 203 receives the media content 209 through a receiver 211 for playback. The media player can be, for example, a TV, computer, audio-video receiver ("AVR"), or the like. One or more processors 213 can process the media content to handle the audio data and the video data. The video data can be buffered in the video buffer 217 and then rendered in a video renderer 219. In some embodiments, the video renderer 219 can be a display screen, a monitor, a projector, a virtual reality headset, or the like. However, the video buffer duration and whether or not the buffer the video is used at all may be determined according to the methods described herein. In some embodiments, the media player 203 might have limited video buffering or lack the support or hardware for video buffering entirely. The audio data can be wirelessly transmitted via the network 205 to the audio receiver 207.

The audio receiver 207 receives audio data through the wireless receiver 223. The audio data is processed by the one or more processors 225 and rendered for output through an audio output 227, such as a headphone, wired speaker, or wireless speaker.

Overview of an Example Synchronization Process

Figure 3:
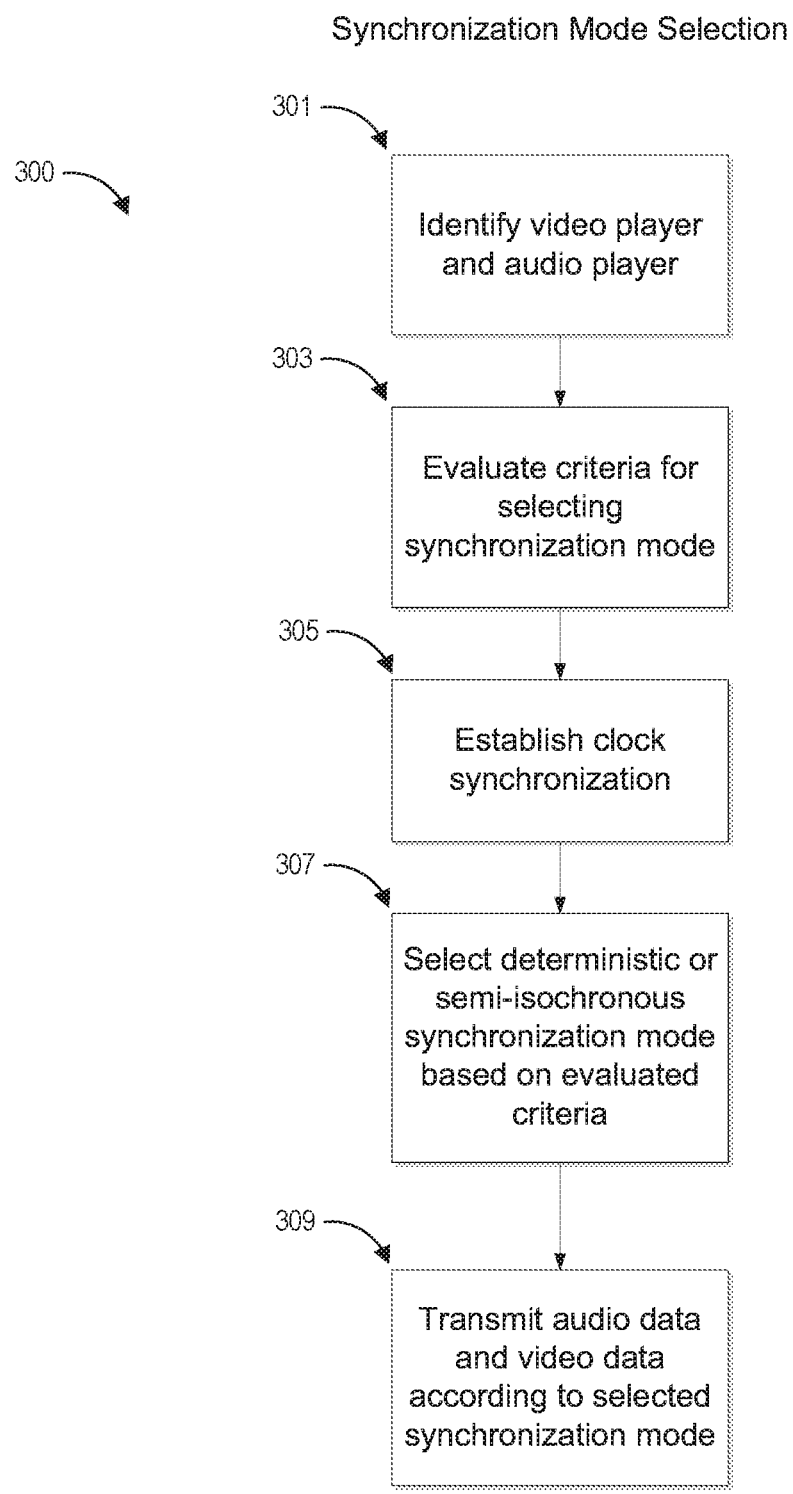
FIG. 3 shows an example process for selecting a synchronization mode for transmitting audio.

FIG. 3 shows an example process 300 for selecting a synchronization mode for transmitting video and audio. The process can be implemented by any of the systems described herein. For example, software executing on a media source or media player can implement the process 300.

At block 301, a video player (or other media source) and an audio player are identified on a network. This can happen, for example, when a video player and an audio player are connected to a network and receive unique connection identifications or addresses. Each video player and audio player can run an application configured to facilitate synchronized audio and video playback.

At block 303, criteria are evaluated to select a synchronization mode. For example, the criteria discussed below with respect to FIG. 4 can be used. Example synchronization modes include, but are not limited, to a deterministic mode and a semi-isochronous mode (see block 307).

At block 305, clock synchronization can be established between the video player and the audio player. This can be performed using one-way or two-way communication between the video player and the audio player. One example of a two-way communication clock synchronization system is the Precision Time Protocol (PTP). In some embodiments, the clock synchronization can performed using a one-way broadcast from the video player through the network to one or more audio players. Embodiments synchronizing clocks based on one-way broadcast can avoid miscalculations based on asymmetric uplink/downlink network times that affect some types of two-way clock synchronization schemes. Furthermore, embodiments synchronizing clocks based on one-way broadcast can perform a single synchronization with multiple devices instead of waiting for each device to separately respond. An example method for establishing clock synchronization is described below with respect to FIG. 9.

The video player and audio player may initially start with clocks that are out of synchronization and unknown to each other. Once clock synchronization has been established, the synchronized clock signal can be used to synchronize audio and video playback between the video player and the one or more audio players. As described in greater detail below, the synchronized clocks can be used to time or track various parameters such as delay periods, playback times, staging times, margin times, and timestamps, among other parameters.

At block 307, a deterministic or semi-isochronous synchronization mode is selected based on the evaluated criteria. At block 309, audio and video data are transmitted according to the selected synchronization mode.

Example Process for Selecting a Synchronization Mode

Figure 4:
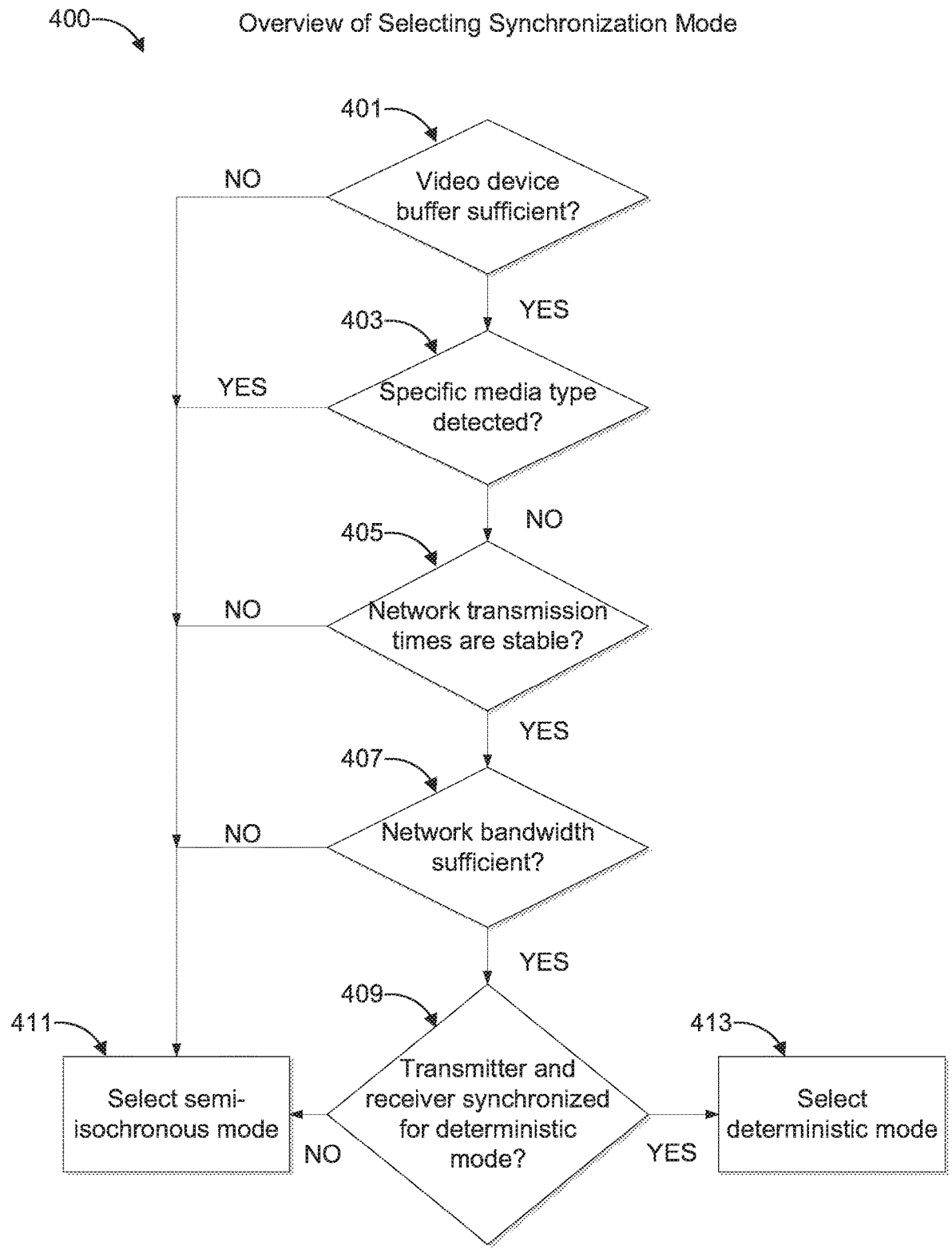
FIG. 4 shows a more detailed example process for selecting a synchronization mode for transmitting audio.

FIG. 4 shows an example process 400 for selecting a synchronization mode (deterministic or semi-isochronous) for transmitting audio. The process can be implemented by any of the systems described herein. For example, software executing on a media source or media player (referred to generically below as "the system") can implement the process 400. In this embodiment, the system evaluates a number of criteria delineated in blocks 401-409 to choose either semi-isochronous or deterministic synchronization. This process may be performed by the media source or media player post-manufacturing (e.g., in a listener's home). In one embodiment, the system defaults to one mode (e.g., deterministic) but switches to the other mode in response to one or more criteria being met. In another embodiment, fewer than all criteria are considered.

At block 401, the system determines if the video device's (or media source's) buffer is sufficient for deterministic mode. Some videos, if uncompressed, may be too large to buffer, and thus delaying those videos for deterministic processing may not be possible (or less desirable due to degradation in video performance). Other videos are delivered in compressed form and are more readily buffered. This step can involve identifying whether the video is compressed, identifying a corresponding size of the buffer, or the like. Alternatively, the buffering capability of a system may be encoded in metadata or the like at manufacture to indicate whether deterministic mode is available, or indicate the extent to which it may be available depending on the bandwidth of an incoming video.

In another embodiment, this step (401) also includes determining whether the video device even supports buffering. This determination can be based on the presence of buffering hardware or based on the capabilities of firmware and software to support buffering. In some embodiments, the determination can be made based on a lookup of the model of the system in a list of models known to have or not to have buffering capabilities. In some embodiments, the determination can be made by attempting to issue test commands to buffer video. If the video device does not support buffering, then the semi-isochronous mode is selected in block 411.

If at block 401 the video device supports buffering, then at block 403, the system determines if a specific media type classified as not suitable for buffering is detected as a media source, such as a video game. Many video games are not suitable for the video buffering used in deterministic mode because any delay in the video may be unwanted by users. The type of media used can be determined, for example, based on a presence of a video game console connected through certain ports to the system, based on the names of one or more running processes detected in the system, combinations of the same, or the like. If a video game (or some other specific type of media) is detected, then the semi-isochronous mode is selected in block 411.

If at block 403 media other than a video game (or other media not suitable for buffering) is detected as the media source, then at block 405, the network can be tested for stability. This can be done, for example, by sending pings to the network and measuring variances in ping time, by sending packets through the network and measuring variances in packet transmission time, by transmitting or receiving data to or from a remote host and measuring variances in the transmission and reception speeds, etc. The testing can be from the video player to the network, between the media player and the audio player, or to a remote internet source. The test measurements can be based on the synchronized clock. If the network transmission times are not stable (e.g., the variance exceeds a certain amount or percentage, the minimum speed dips below certain amount, etc.), then the semi-isochronous mode is selected in block 411.

If at block 405 the network transmission times are stable, then at block 407, the network is tested for bandwidth. This can be done, for example, by sending several packets (e.g., an amount typical of audio data) through the network to the audio device or other destination. The rate at which the data is received can be used to determine the bandwidth. The test measurements can be based on the synchronized clock described above with respect to FIG. 3 (see also FIG. 9). If the network bandwidth is insufficient (e.g., average bandwidth is below a certain threshold, minimum bandwidth dips below a certain amount, etc.), then the semi-isochronous mode is selected in block 411.

If at block 407 the network is determined to have a sufficient bandwidth, then at block 409 the transmitter and receiver can determine if both the video player and the audio player support playback via deterministic mode. This can be based on whether the clock is synchronized or capable of being synchronized between the video player and the media player and whether or not the applications in both the video device and in the audio device have configured the respective devices to support deterministic mode. If not, then the semi-isochronous mode is selected at block 411. If both the video player and the audio player are synchronized for deterministic mode, then the deterministic mode is selected at block 413. As network conditions change, one or more blocks shown in FIG. 4 can be performed again to reevaluate network conditions and change the playback mode. Thus, the playback mode can change in real time, based on real-world network conditions.

Semi-Isochronous Mode Example Processes

Figure 5:
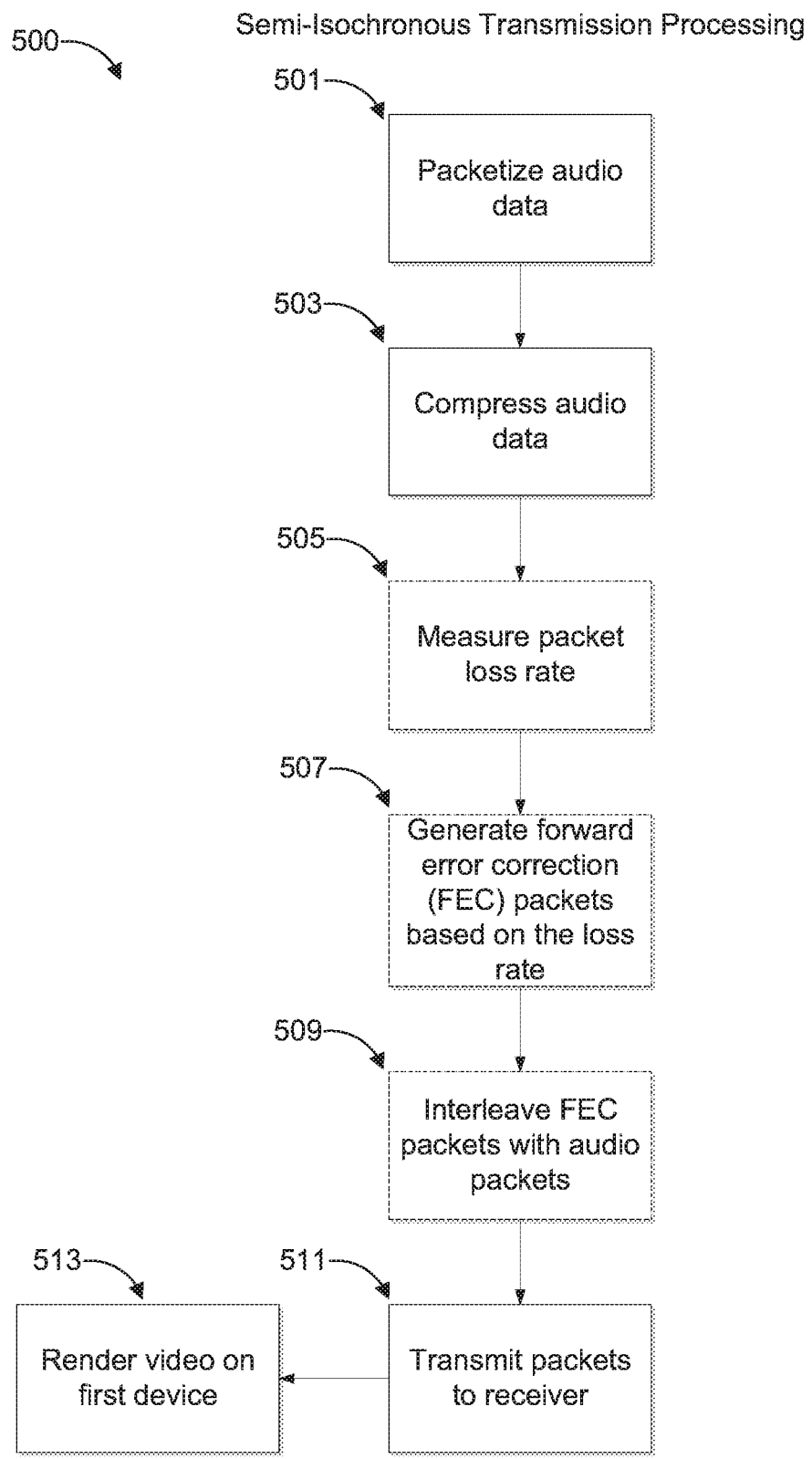
FIG. 5 shows an example process for media transmission processing according to a semi-isochronous mode.

FIG. 5 shows an example process 500 for media processing according to a semi-isochronous mode. The process can be implemented by any of the systems described herein. For example, software executing on a media source or media player (referred to generically below as "the system") can implement the process 500.

Semi-isochronous mode can be selected to quickly transmit and render audio. In a semi-isochronous system, audio data may be compressed by the media player, transmitted to the audio player, and if received within a reasonable time delay, the audio data can be rendered.

By compressing data, semi-isochronous mode may perform better than deterministic mode when a network connection is crowded and has low available bandwidth. Also, because semi-isochronous does not involve buffering received audio to be played at a particular delay time (in some embodiments), semi-isochronous mode can perform better than deterministic mode when network speeds are highly variable and audio packets may not reach a target destination before the delay time. Nonetheless, deterministic mode can provide better performance in other scenarios where a fast, stable network connection is available.

At block 501, the audio data is packetized using, for example, currently available Internet protocols (such as TCP/IP).

At block 503, audio data is compressed. Because compressed audio data uses less bandwidth, it can transmit faster on crowded networks. The compression scheme can be lossless or lossy, with some lossy algorithms potentially providing faster performance (due to higher compression rates) with the tradeoff of audio signal degradation. At block 505, the packet loss rate is optionally measured.

At block 507, forward error correction (FEC) packets are optionally generated based on the loss rate. FEC can provide improve packet loss recovery using one-way communication such as the audio transmission described herein. Additionally, FEC can be particularly useful because the short amount of time that the audio data needs to be rendered might not leave enough time for a request to transmit followed by a retransmitted payload. While many FEC algorithms could be used, in one embodiment, the system generates a FEC packet by applying XOR (exclusive OR) operations over one or more packets as described, for example, in RFC 5109, "RTP Payload Format for Generic Forward Error Correction" (2007), which is hereby incorporated by reference in its entirety. At block 509, the FEC packets can be interleaved with audio packets. At block 511, the packets can be transmitted to a receiver.

At block 513, video can be rendered on a first device, such as a TV system. In some embodiments, the video is rendered without buffering. In some embodiments, the video can be briefly buffered based on an average or minimum expected transmission and processing time. The buffering time can be estimated based on network tests (e.g., tests discussed with respect to blocks 405 and 407 of FIG. 4), and the buffering time can be selected such that the audio will play at or just after (e.g., within 1 to 3 frames) of the video. For example, if the network pings typically range from 200 to 300 ms with occasional speeds as fast as 100 ms, the buffer can be 100 ms (optionally plus the fastest audio rendering time).

Figure 6A:
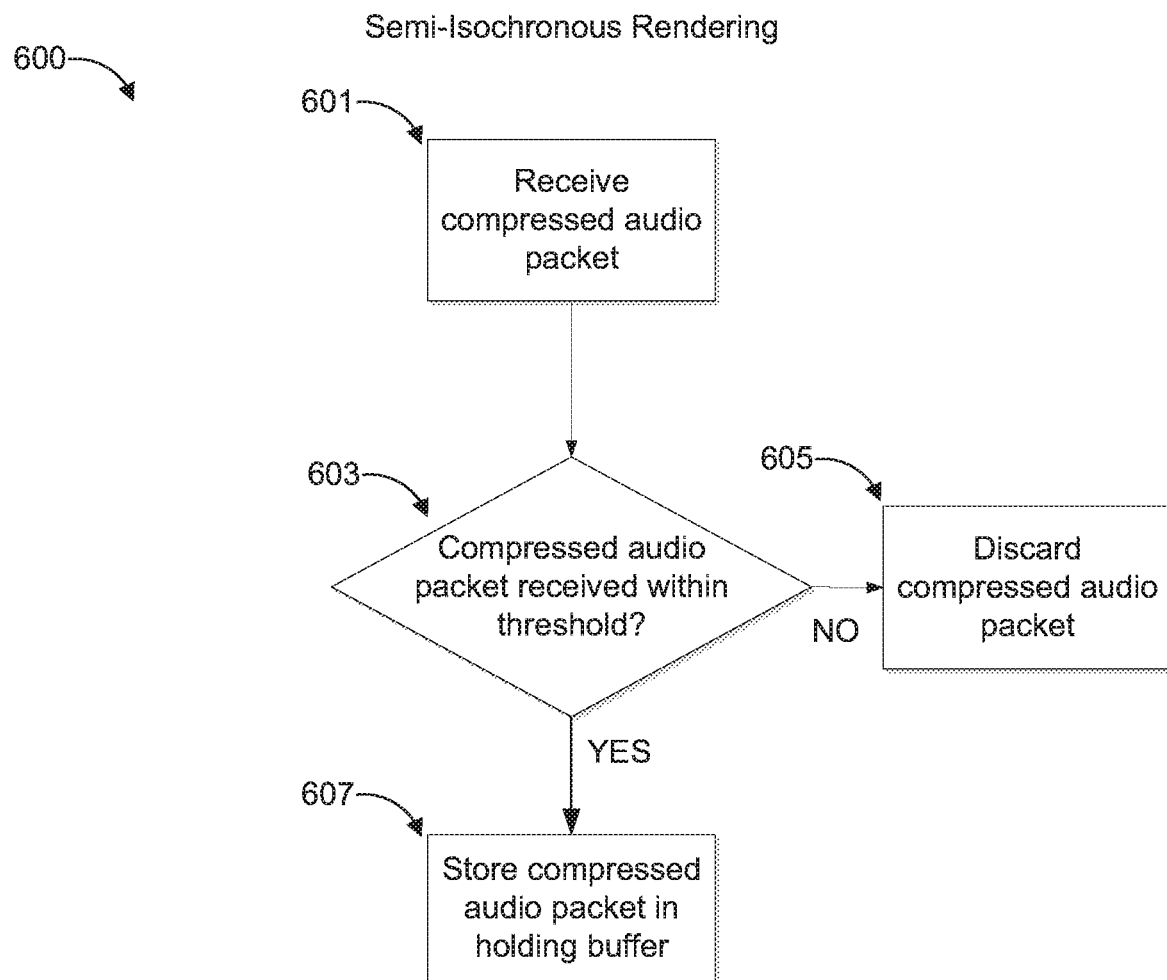
FIGS. 6A, 6B, and 6C shows an example processes for receiving and rendering audio according to a semi-isochronous mode.
Figure 6B:
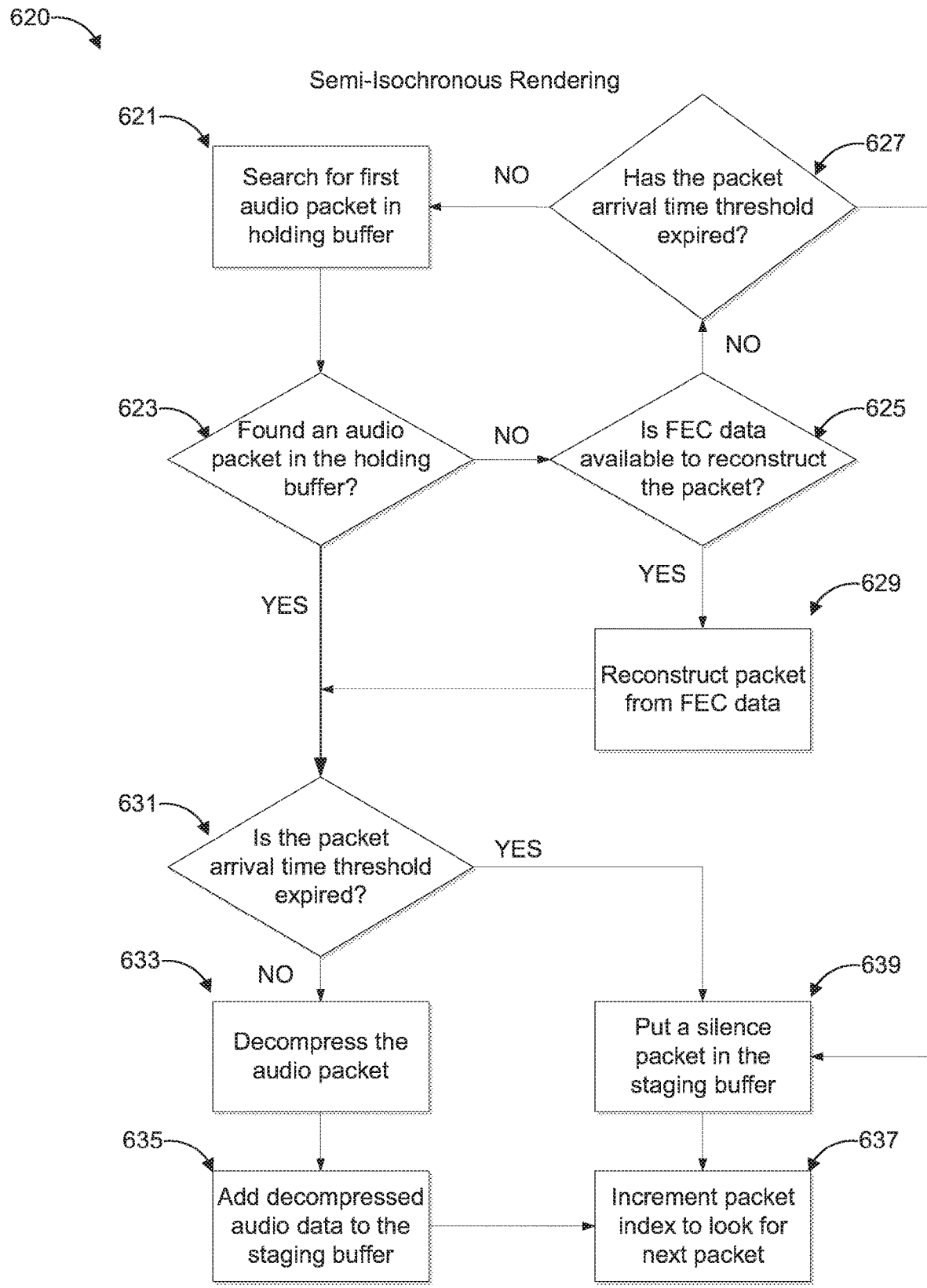
Figure 6C:
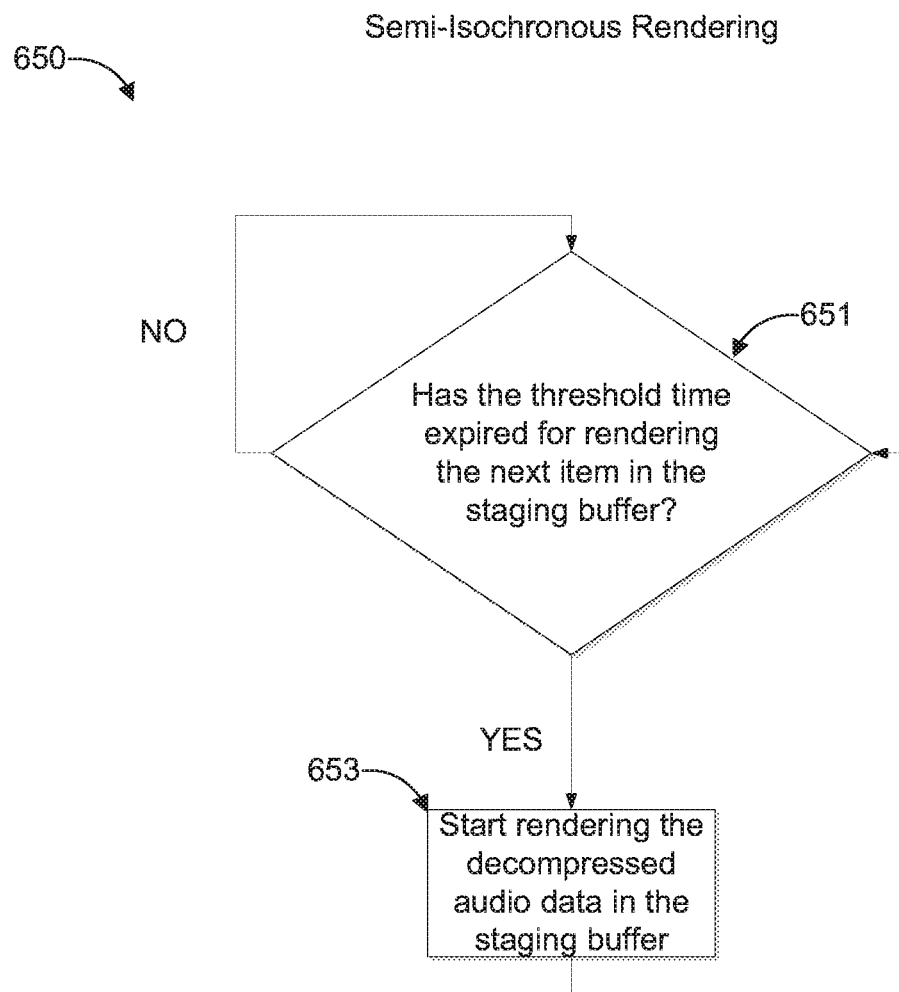

FIGS. 6A, 6B, and 6C show example processes 600, 620, and 650, respectively, for receiving and rendering audio according to a semi-isochronous mode. For example, software executing on an audio receiver, such as a mobile device, can implement the processes 600, 620, and 650.

FIG. 6A shows a first example process 600 for receiving and rendering audio according to a semi-isochronous mode. At block 601, the audio receiver receives compressed audio packet. At block 603, the receiver determines if the compressed audio packet was received within a first threshold. If the compressed audio packet was not received within the first threshold, then at block 605, the audio receiver discards the compressed audio packet. The first threshold can be approximately the time it would take to render two video frames at the TV (about 66 ms in some systems). If the compressed audio packet was received within the first threshold, then at block 607, the audio receiver stores the compressed audio packet in a holding buffer.

FIG. 6B shows a second example process 620 for receiving and rendering audio according to a semi-isochronous mode. At block 621, the audio receiver searches a holding buffer for a first packet. The first packet can be, for example, the compressed audio packet that was stored in the holding buffer at block 607. At block 623, it is determined if the audio receiver found the first packet in the holding buffer. If the first packet was not found, then at block 625, it is determined if FEC or redundant data is available to construct the first packet. The receiver can attempt to identify redundant or FEC correction data. Redundant or correction data can be obtained, for example, from a previously transmitted error correction packet such as an FEC packet. Correction data can also be extracted for a dropped packet if the subsequent packet is available using curve-fitting techniques to guess at the missing packet data based on data in the previous and subsequent packets, among other possible techniques. If FEC data is determined to be available, then at block 629, the first packet is reconstructed from the FEC data.

If the first packet was found in the holding buffer or reconstructed, then at block 631, it is determined if the packet arrival time threshold has expired. If the packet arrival time threshold has not yet expired, then at block 633, the first packet is decompressed to generate decompressed audio data. At block 635, the decompressed audio data is added to a staging buffer of the audio receiver. At block 637, the audio receiver increments a packet index to look for a next packet (e.g., after the first packet is processed, to look for a second packet).

If at block 625, no FEC data is available to reconstruct the first packet, then at block 627, it is determined if the packet arrival time has expired for finding the first packet. If the packet arrival time has not yet expired, then the process 620 can proceed again to 621 so that the holding buffer can continue to be searched for the first packet.

If at either of blocks 627 or 631, the packet arrival threshold time has expired for the first packet, then the process can proceed to block 639, where a silence packet is inserted to the staging buffer. In some embodiments, a duplicate packet can be inserted into the staging buffer instead of inserting silence. Past a certain delay, such as two video frames' delay, an audio packet may be detectably out of sync with the video, and thus dropping the audio packet may be the preferred course of action. Then, at block 637, the packet index can be incremented, and the process 620 can be repeated for the next audio packet.

FIG. 6C shows a third example process 650 for receiving and rendering audio according to a semi-isochronous mode. At block 651, it can be determined if the threshold time has expired for rendering the next item in the staging buffer. If at block 651, the threshold time for rendering the next item in the staging buffer has not yet expired, then the process 650 can repeat block 651 until the threshold time does expire. When the threshold time expires, then at block 653, the audio receiver can start rendering the next item in the staging buffer. The next item can be, for example, the decompressed audio data that was added to the staging buffer of the audio receiver at block 634. The process can then proceed back to block 651.

Deterministic Mode Examples Processes

Figure 7:
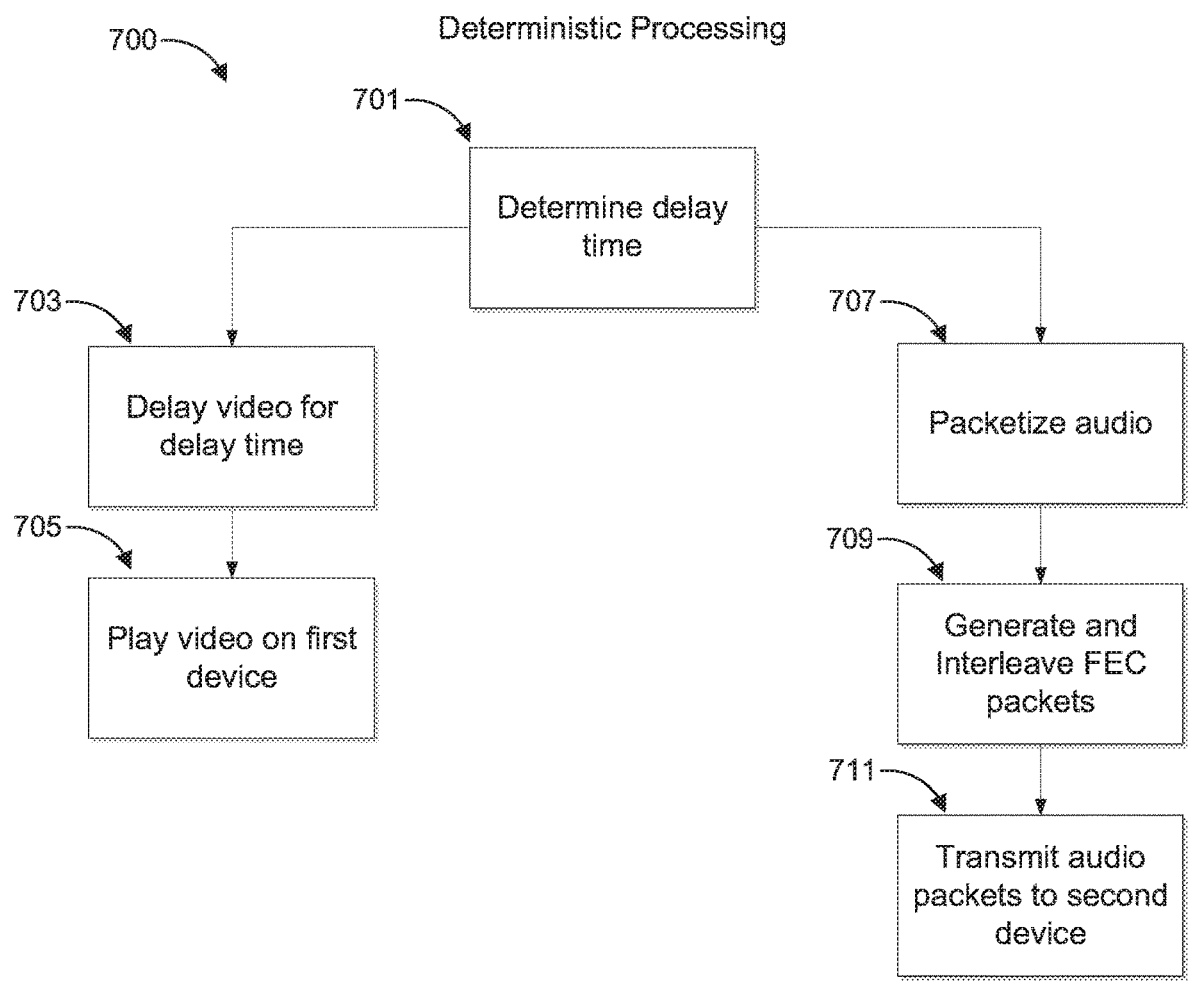
FIG. 7 shows an example process for media transmission processing according to a deterministic mode.

FIG. 7 shows an example process 700 for media processing according to a deterministic mode. The process can be implemented by any of the systems described herein. For example, software executing on a media source or media player (referred to generically below as "the system") can implement the process 700.

In deterministic mode, a delay time can be determined to allow enough time for audio transmission and rendering in the presence of normal network fluctuations while accounting for delays in video rendering. The media source can transmit the audio payload at a time before the audio is scheduled to be rendered. Once transmitted to a second device, the audio payload can be buffered until the playback time and thus is synchronously rendering with the video. While the audio is being transmitted to and processed in the second device, video data may be buffered in a first device until the playback time, and then the video data can be rendered. The media source and the receiving device can use a synchronized clock signal to synchronize the audio and video output (see, e.g., FIGS. 9 and 10).

At block 701, a delay time is determined. The delay time can be long enough so that an audio packet can be received by the audio device and rendered at the delayed time synchronously with video rendered by the video device. A maximum delay time can be determined by a video buffer capacity. The delay time can be set to be greater than an average or maximum expected transmission and processing time. The delay time can be set to be greater than an average transmission and processing time plus a multiple of a standard deviation. If the delay time is long enough so that the majority of packets can be synchronously rendered, the remaining small amount of packets can be concealed with error masking or correction techniques.

The delay time can be predetermined (e.g., at manufacture) or can be estimated based on network tests (e.g., tests discussed with respect to blocks 405 and 407 of FIG. 4). For example, if the network pings typically range from 400 to 500 ms with occasional lags of up to 900 ms, the delay time can be 900 ms (optionally plus the time it takes to render audio after receiving an audio packet) if supported by the video buffer.

The delay time may be measured based on the synchronized clock, and may be in the form of an amount of time (e.g., 2 seconds and 335 microseconds) to be delayed after a timestamp. In some embodiments, the delay time is set in the form of a presentation time at which audio and video is to be played (e.g., video is buffered at 12:30:00:000 pm and the playback is set for 12:30:02:335 pm). In an embodiment featuring multiple devices configured to playback audio, the measurements can be based on the worst-case measurements out of all of the multiple devices (while still within buffering hardware capability). In some embodiments, the delay time can be 0.5, 1, 2, 3, 4, 5, or 6 seconds or another similar time.

At block 703, video is delayed for the delay time. The delay can be implemented using a video buffer (such as video buffer 217 of FIG. 2). Some embodiments buffer compressed video.

At block 705, the video can be played on a first device at the delayed time. The delayed time is determined based on the synchronized clock. In some embodiments, playing the video can include decompressing the video to render it. Video playback from the buffer can be very fast, although not instantaneous. Accordingly, in some embodiments a slight adjustment for the playback time can be made when determining timing parameters (e.g., the delay time) for further refined performance.

At block 707, audio data is packetized. The packet can be formed with a timestamp based on the synchronized clock, the sequence number of the packet, the bit rate, staging time, margin time, other header information, and the audio payload comprising the compressed audio data. The timestamp can be initialized as a current time TO of the media device transmitting the packets. For subsequent S packets or staging times, subsequent timestamp or staging times can be calculated adding (S*D) to an initial staging time or initial timestamp, where D represents the playback time of a packet, and where S is an integer. Calculating subsequent timestamps or staging times instead of reporting the actual times can in some embodiments improve algorithms to correct clock drift. For example, when the current time measured by a clock of an audio device has drifted outside of an expected range compared to the timestamps or staging times, then clock resynchronization can be performed to correct the clock drift.

At block 709, FEC packets can be generated, as described above, and interleaved with the packetized audio data. This can be done at the payload level, at the packet level, or at another level. FEC packets can be generated based on the loss rate.

At block 711, the audio packets are transmitted to a second device through the network.

Figure 8:
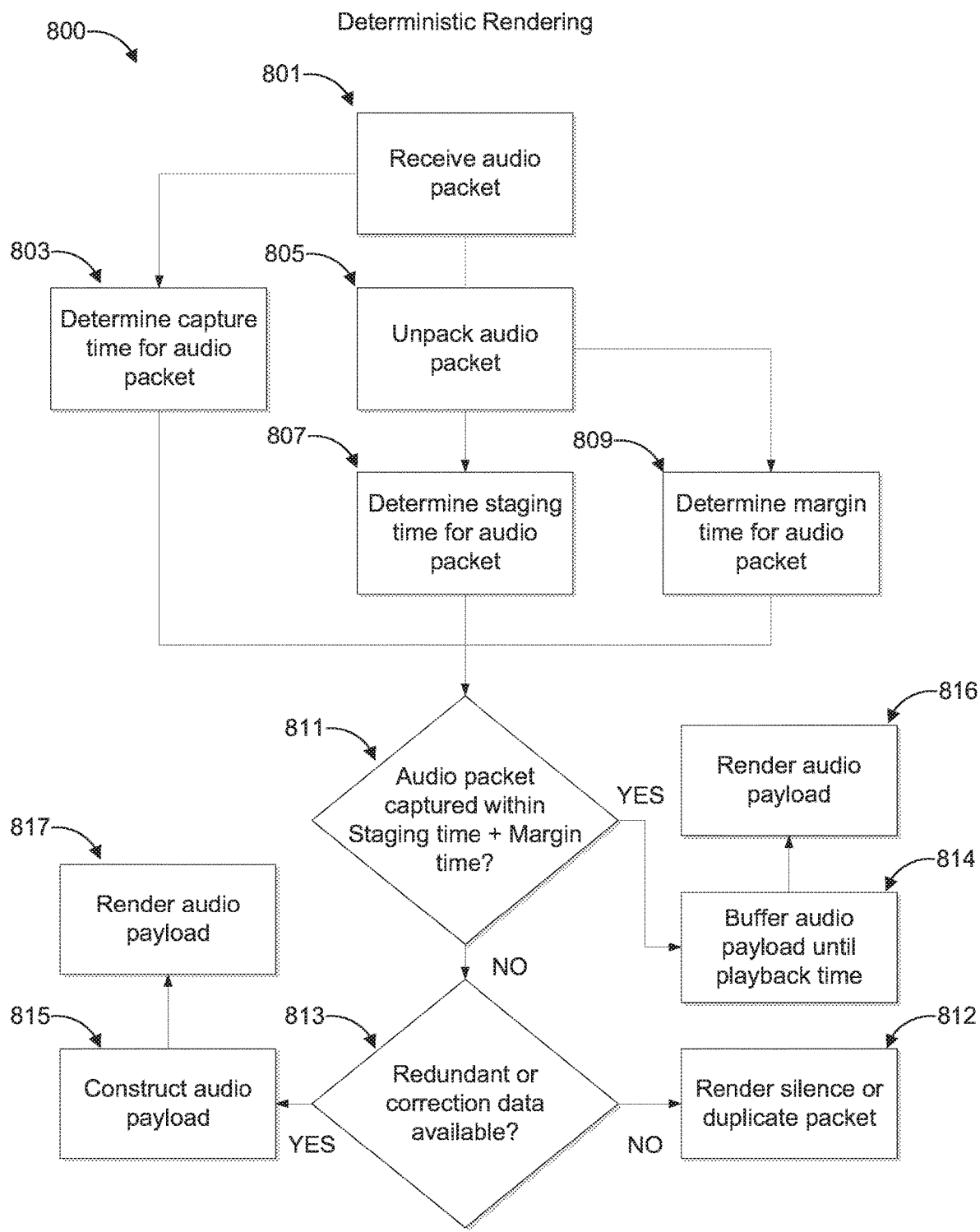
FIG. 8 shows an example process for receiving and rendering audio according to a deterministic mode.

FIG. 8 shows an example process 800 for receiving and rendering audio according to a deterministic mode. The process can be implemented by any of the systems described herein. For example, software executing on an audio receiver, such as a mobile device, can implement the process 800.

At block 801, an audio packet is received. For example, with respect to FIG. 2, the wireless receiver 223 of the audio receiver 207 can receive an audio packet transmitted through network 205.

At block 805, the audio packet is unpacked, and optionally the capture time for the audio packet may be determined. The capture time can be measured based on the synchronized clock. Various embodiments can unpack the packet at different levels of hardware/firmware/software. The timestamp based on the synchronized clock, the sequence number of the packet, the bit rate, the staging time, the margin time, other header information, and the audio payload comprising the compressed audio data can be determined by unpacking the audio packet.

At block 807, the staging time for the audio payload is determined. The staging time can be measured based on the synchronized clock signal and identifies the time or frame that a video was played at or is to be played at.

At block 809, a margin time for the audio payload is determined. The margin time can be an amount of time before or after the staging time that the audio payload can be rendered. In some embodiments, the margin time is determined and then communicated in a separate packet (e.g., at the beginning of a series of packets, or periodically inserted into a series of packets). A margin time can be, for example, 20, 30, 33, 46, 50, 60, 66, 80, 99, or 100 milliseconds; 0.5, 1, 1.5, 2, 2.5, or 3 frames; etc.

At block 811, a comparison is made to determine if the audio packet was captured within the staging time plus (or minus) the margin time. If at block 811 the audio packet was captured within the staging time plus the margin time, then at block 813 the audio payload is buffered (814) and rendered (816).

If at block 811 the time that audio packet was captured after the staging time by the margin time, then at block 815 redundant or correction data can be obtained and constructed. Block 815 can be decided at a time still within the staging time plus or minus the margin time. Redundant or correction data can be obtained, for example, from a previously transmitted error correction packet such as an FEC packet. Correction data can also be extracted for a dropped packet if the subsequent packet is available using curve-fitting techniques to guess at the missing packet data based on data in the previous and subsequent packets. At block 817, the audio payload constructed from the redundant or correction data is rendered.

If at block 815 no redundant or correction data is available within the staging time plus the margin time, then at block 819, silence or a duplicate of a previous packet can be rendered in place of the missing packet.

Example Clock Synchronization Processes

Figure 9:
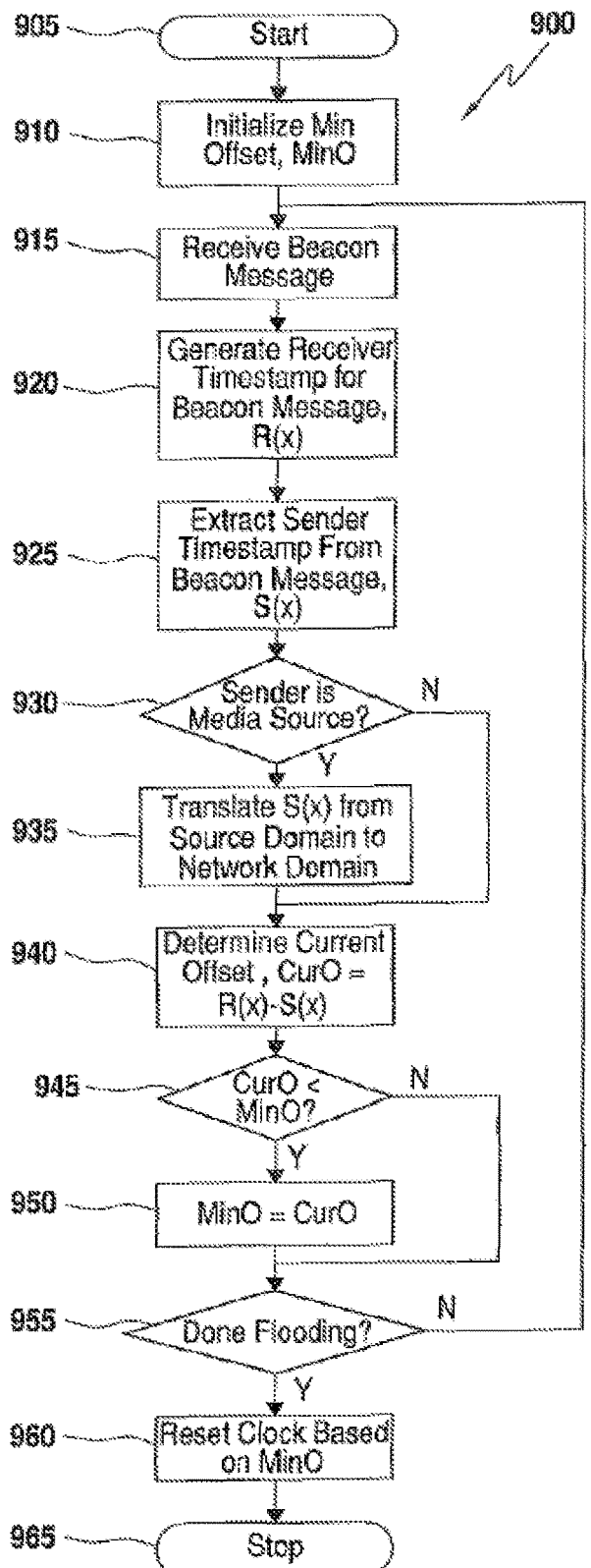
FIG. 9 shows an example process for initializing clock synchronization.
Figure 10:
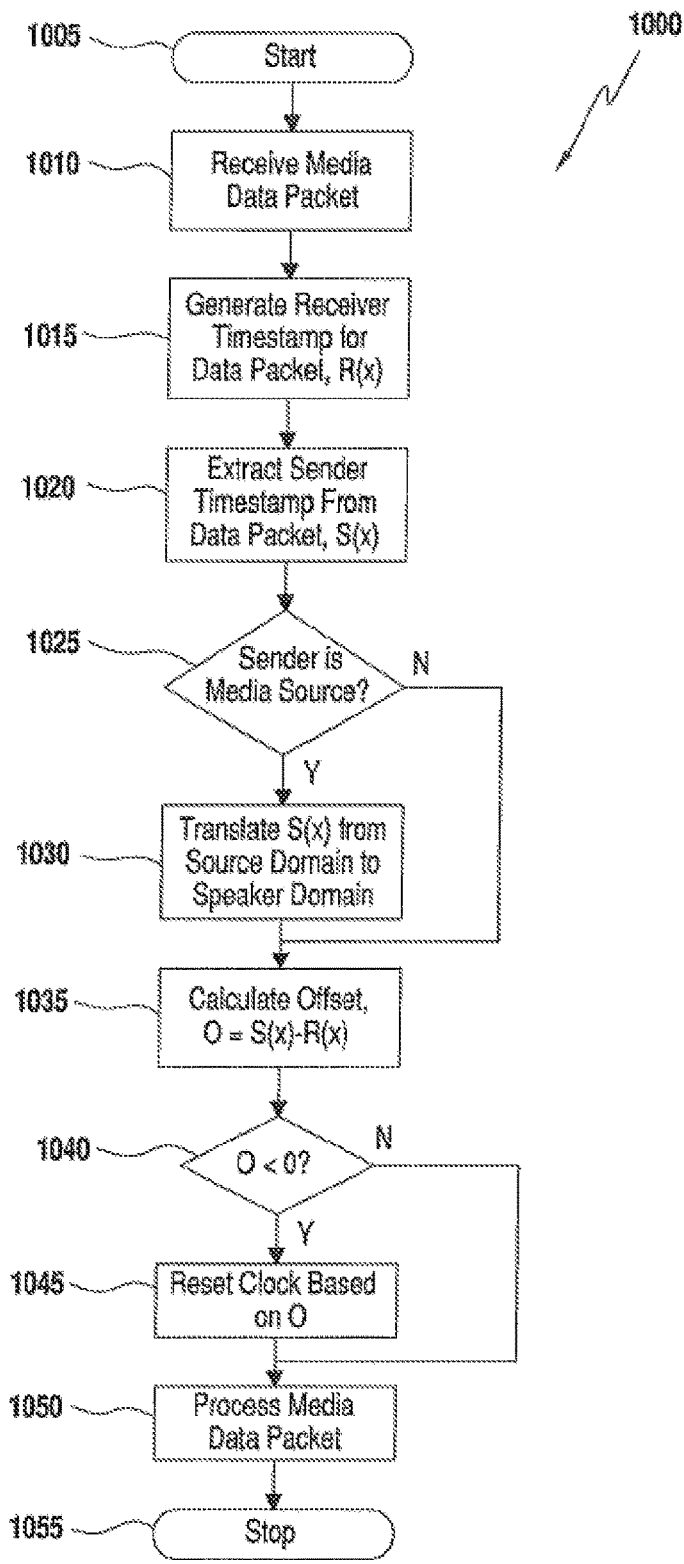
FIG. 10 shows an example process for resynchronization and correcting clock drift.

FIG. 9 shows an example 900 process of an example method for initializing clock synchronization. FIG. 10 shows an example process 100 of an example method for resynchronization and correcting clock drift. These processes can be implemented by any of the systems described herein. FIGS. 9 and 10 are discussed in U.S. Pat. No. 9,237,324, titled "Playback Synchronization," filed on Sep. 12, 2013, which is hereby incorporated by reference in its entirety.

Example method 900 can be performed by any media device with a wireless receiver (e.g., audio receiver 207 of FIG. 2). The example method 900 can be performed as a part of block 305 of exemplary method 300 or at any time when synchronization of timing parameters between media devices is appropriate. Method 900 provides an example of clock synchronization based on one-way communication. A media device can repeatedly transmit ("flood") a clock signal with clock "ticks" at a constant rate (e.g., 100 ms) as a beacon message through a network to audio receivers. Due to variations in network performance, the audio receivers may receive the clock signal at times that vary. However, the audio receiver can determine when a set of clock signals are received at approximately the constant rate (e.g., receives signals at 100 ms apart) and use those timings as a basis upon which to perform further statistical analysis to refine the clock synchronization. The audio receiver can do this without transmitting timing information to the media player.

An example method 900 begins at block 905 and proceeds to block 910 where the receiving device initializes a minimum offset variable "MinO" for use in keeping a running minimum offset value as new messages are received or processed. Next, in block 915, the receiving device receives a beacon message from the sending device. Then, in block 920, the receiving device generates a timestamp based the time as currently represented by the receiving device's clock. Such a timestamp may be referred to as the "receiver timestamp," "R(x)." The time that elapses between blocks 915 and 920 forms part of the fixed delay component of the clock offset values that will be calculated by the receiving device. As such, various implementations of the method 900 strive to reduce or minimize the number of operations that occur between blocks 920 and 925.

In block 925, the receiving device extracts the sender timestamp, "S(x)," from the beacon message. The sender timestamp is inserted into the beacon message by the sender device shortly before the beacon message transmission. In block 930, the receiving device determines whether the sending device is the media source of the virtual media network. In such a case, the method 900 proceeds to block 935. The receiving device then translates the sender timestamp from a time domain of the sending device to the time domain of the virtual media network. Such translation may involve adding or subtracting an offset previously negotiated between the two devices. Such negotiation and translation between time domains may be performed according to any method known to those of skill in the art. In some alternative embodiments, the source device and media nodes maintain clocks in the same time domain. In some such embodiments, blocks 930, 935 are not present.

After translating the sender timestamp into the virtual media network domain in block 935 or after determining that the sender is not the media source in block 930, the method 900 proceeds to block 940, where the receiving device calculates an offset value based on the sender timestamp and the receiver timestamp such as, for example, the difference between the two timestamps. This current offset value, "CurO," is equivalent to the true offset between the sender and receiver clocks plus any delay encountered by the beacon message between the creation of the two timestamps, S(x) and R(x). As noted above, this delay includes two components. A first component of the delay is the fixed delay associated with the time taken to traverse the hardware and software components of the network such as, for example, constant delay associated with the circuits and datapaths over which the messages travel along with time taken by the OS between transmission/receipt of a message and generation of the associated timestamp. Such a fixed delay may already be taken into account as part of the rendering process. The second component of the delay is the variable network delay associated with the delay that changes over time. For example, shared medium networks such as Wi-Fi may wait for the medium to be clear before transmission and, as such, may introduce different delays at different times.

Because the variable delay only introduces additional delay (and does not remove delay), a better estimate of the true clock offset is obtained from the message that was delayed the least. As such, the method 900 searches for the minimum offset value obtained during the flood of beacon messages as a best available estimate of the true offset. In block 945, the receiving device compares the current offset, CurO, to the previously located minimum offset or if the current iteration of the loop is the first to the minimum offset value as initialized in block 910, MinO. If CurO is less than MinO, then CurO is known to represent a closer estimate of the true offset between the sender and receiver clocks and, in block 950, the receiver device overwrites the value of MinO with the value of CurO.

In block 955, the receiver device determines whether the sender device is done flooding beacon messages. For example, the receiver device may determine whether a timeout has occurred when waiting for an additional beacon message, may determine that the sender device has begun sending media messages, may determine that a predetermined number of beacon messages has been received, or may determine that the sending device has transmitted a special message indicating the end of flooding. In various embodiments, the receiver device determines whether the flooding was sufficient to establish a desired accuracy of an offset. For example, the receiver device may track the intervals at which the beacon messages are received and, based on a comparison of the measured intervals to a known time interval, may determine whether or not the network was stable enough to produce the desired accuracy of an offset value. If the network was not sufficiently stable, the receiving device transmits a message to the sending device indicating that additional flooding should be performed. Various modifications will be apparent. It will be apparent in view of the teachings herein that various combinations of these and other methods for determining the sufficiency of beacon message flooding may be employed.

If the receiving device determines that additional flooding is being or will be performed, the method 900 loops back from block 955 to block 915 to process additional beacon messages. Otherwise, the method 900 proceeds to block 960 where the receiving device resets the local clock based on the determined minimum offset. For example, the receiving device may subtract MinO from the current clock value to set the local clock to a new value estimated to be closer to the actual clock value of the sending device. In some embodiments wherein the fixed delay of the network is known or estimated, the receiving device subtracts MinO from the current clock value and adds back in fixed delay value to attempt to isolate the true clock offset value of the computed offset value. In some embodiments, the receiving device does not alter the local clock at all and, instead, may maintain the minimum offset value, MinO, for use in comparing timestamps received from the sender device and the local clock. For example, the receiving device may add MinO to the timestamp prior to any such comparison. Various other modifications will be apparent. The method 900 may then proceed to end in block 965. The reset clock when method 900 is completed can be considered as the synchronized clock.

In various alternative embodiments, the receiving device utilizes a previously established lower bound offset to help ensure that an unreasonably large offset calculated during the flooding period is not used to reset the clock. For example, if the flooding period is encompassed by a period of high variable network delay, the calculated offset may be much larger than the true value of the offset between the sender and receiver clocks. In some such embodiments, the receiver first compares the minimum offset calculated in blocks 940-950 to the previously established lower bound offset to determine whether the minimum offset is greater than the lower bound offset. If so, the receiver declines to update the clock based on the minimum offset and continues to use to previously-established lower bound. Otherwise, the receiver updates the clock as detailed in block 960 because the minimum offset value is less (and therefore a better estimate) than the lower bound.

In various embodiments, the receiving device performs the method 900 periodically to reestablish synchronization. In some such embodiments, the receiving device resets the clock to its original value, deletes a stored offset value, or otherwise "rolls back" any changes made based on previous executions of the method 900 to thereby "start over" in determining a clock offset. By periodically reestablishing the clock offset, the receiving device may better account for clock drift between the sending device and receiving device clocks.

It will be apparent in view of the teachings herein that, while method 900 is described as a real time method that processes each beacon message as it is received, various alternative embodiments utilize methods that process beacon messages as a batch. For example, in some such embodiments, the receiving device receives multiple beacon messages, timestamps the messages at the time of receipt, and at a later time processes the received messages in sequence to locate a minimum offset in a manner similar to that described with respect to blocks 925-960.

It will be understood that, while the foregoing methods attempt to generate a best estimate of the clock offset between two devices. It is possible that network conditions may temporarily improve after this initial flooding period and that a better estimate may be obtained later. Accordingly, methods may be employed after the initial timing parameter establishment to attempt to better estimate the clock offsets. Such methods may also address the possibility of clock drift, wherein differences in the crystal, temperature, or other parameters may cause the sending device clock and receiving device clock to operate at slightly different rates.

FIG. 10 shows an example process 100 of an example method for resynchronization and correcting clock drift. Due to imperfections, a local clock of any device in a system can slowly drift. The example method can be used for a receiving media device to obtain better playback synchronization during media streaming. The exemplary method 1000 may be performed by any media device that functions as a receiving media device. The example method 1000 may be performed as a part of block 309 of FIG. 3 or at any time when synchronization of timing parameters between media devices is appropriate.

The example method 1000 begins in block 1005 and proceeds to block 1010 where the receiving device receives a media data packet from the sending device. Next, in block 1015, the receiving device generates a timestamp based the time as currently represented by the receiving device's clock, R(x). In block 1020, the receiving device extracts the sender timestamp, "S(x)," from the media data message. The sender timestamp may have been inserted into the media data message by the sender device shortly before transmission. In block 1025, the receiving device determines whether the sending device is the media source of the virtual media network. In such a case, the method 1000 proceeds to block 1030. The receiving device then translates the sender timestamp from a time domain of the sending device to the time domain of the virtual media network. Such translation may involve adding or subtracting an offset previously negotiated between the two devices. Such negotiation and translation between time domains may be performed according to any methods known to those of skill in the art. In some alternative embodiments, the source device and media nodes maintain clocks in the same time domain. In some such embodiments, blocks 1020, 1030 are present.

After translating the sender timestamp into the virtual media network domain in block 1030 or after determining that the sender is not the media source in block 1025, the method 1000 proceeds to block 1035, where the receiving device calculates an offset value based on the sender timestamp and the receiver timestamp such as, for example, the difference between the two timestamps. In the case where the sender timestamp has been translated, the translated timestamp is used in calculating the offset. This offset value, "O," is equivalent to the true offset between the sender and receiver clocks plus any delay encountered by the media data message between the creation of the two timestamps, S(x) and R(x), including both fixed and variable delay. In block 1040, the receiving device determines whether the offset value represents a better estimation of the offset between the clocks than previously utilized. For example, in various embodiments wherein the previously-determined minimum offset is used to reset the clock of the receiving device, the receiving device determines whether the current offset, O, is less than zero. A positive result on this comparison indicates that the previously-used minimum offset may have incorporated some variable network delay and the subtraction thereof from the local clock "overshot" the ideal setpoint, thereby setting the local clock behind the sender's clock. The current offset, O, by incorporating less (or zero) variable delay than the previously-used minimum may reveal this overshoot by being a negative number. In such a case, the current offset, O, will be judged to reveal the new best estimate of the true clock offset and, in block 1045, may be used to reset the local clock again thereby at least partially correcting the previous overshoot. Various modifications for other embodiments will be apparent. For example, in embodiments wherein the previously-determined minimum offset is not used to modify the local clock and is instead persisted for use in timestamp comparisons, block 1040 determines whether the current offset, O, is less than the previous minimum offset, MinO, and, if so, the receiving device sets MinO equal to O in block 1045. Various other modifications will be apparent.

In various alternative embodiments, the receiving device utilizes a previously established lower bound offset to help ensure that an unreasonably large offset calculated during the flooding period is not used to reset the clock. In some such embodiments, the receiver first compares the offset calculated in block 1035 to the previously established lower bound offset to determine whether the offset represents a better estimate of the true offset than the lower bound offset. If so, the receiver declines to update the clock based on the minimum offset and continues to use to previously-established lower bound. Otherwise, the receiver updates the clock as detailed in block 1045 because the offset value is a better estimate than the lower bound.

In block 1050, the receiving device proceeds to process the received media packet to, for example, render media output at an appropriate time. For example, the receiving device may extract or calculate a presentation time, separate from the sender timestamp and the receiver timestamp, from the media data packet. Such a presentation time indicates a time at which the media data carried by the message should be rendered. After extracting the presentation time, the receiving device causes the media data to be rendered at a time matching the presentation time. For example, the receiving device may buffer the media data for playback by a local playback device or may forward the message to another media node for playback. It will be understood that a current time that "matches" a presentation time may encompass equivalence between the current time and the presentation timestamp but may also encompass other forms of matching. For example, in various embodiments, the current time matches when the current time minus a persisted minimum offset value equals the presentation timestamp. Additionally or alternatively, the comparison for matching adds, subtracts, or otherwise takes into account a fixed delay value. Various other methods for determining an appropriate time for playback based on a local clock, a presentation timestamp, and other potentially available values will be apparent. Further, the concept of a current time matching a presentation time based on a minimum offset value will be understood to encompass comparisons utilizing a local clock that has previously been modified by a minimum offset value but otherwise do not explicitly take the minimum offset value into account. Various embodiments perform such a comparison immediately prior to output to ensure that the data is output at the appropriate time. Other embodiments use such a comparison to insert the media data into a playback buffer at a position where the media is likely to be played back at the presentation time. Such insertion may involve the insertion of "dummy" data prior to insertion of the media data to adjust the timing of the playback. Various additional methods of controlling the playback timing of data in a buffer will be apparent.

Additional Embodiments

As shown in FIG. 1, a phone 105 can output audio through wireless speakers 141 or through wired headphones 153. Audio can be rendered faster through wired headphones than a wireless speaker. Accordingly, this variation in rendering time can be accounted for during audio synchronization. For example, in deterministic mode, if the transmission and rendering through wireless speakers 141 takes 25 ms, then phone 1 105 can transmit the data to wireless speakers 25 ms in advance of staging time. In another example, in deterministic mode, if the transmission and rendering through wireless speakers takes a variable 25-50 ms, then phone 1 can implement a deterministic mode so that the phone transmits audio to the wireless speakers at least 50 ms before the audio is scheduled to be played and also transmit a delay time indicating when the audio should be played. The wireless speaker can receive the audio and buffer it until the end of the delay time, and then play the audio.

In some embodiments, audio can be passed through a plurality of intermediate devices communicating through a network before the audio is finally rendered. For each intermediate step of transmission through a network, a transmitting device and a receiving device can perform the methods described above so that the final audio rendering will be synchronized with video playback.

One aspect features a method for multimode synchronous media playback between an audio player and a video player comprises identifying a video player connected to the wireless network and an audio player connected to the wireless network; synchronizing a clock signal between the video player and the audio player; determining, as an audio sync mode, a deterministic mode or a semi-isochronous mode; receiving an audio packet; unpacking the audio packet to extract: a timestamp and an audio payload; determining a received time of the audio packet as measured by the synchronized clock signal; and rendering an audio output according to the audio sync mode.

In some embodiments, the audio sync mode is the deterministic mode, and the method further comprises determining, based at least in part on the timestamp, an expected playback time as measured by the synchronized clock signal; buffering the audio payload until the expected playback time; and rendering the audio payload at the playback time.

In some embodiments, the audio sync mode is the deterministic mode, and the method further comprises determining, based at least in part on the timestamp, an expected playback time as measured by the synchronized clock signal; determining that the audio payload will not be available by the expected playback time; and rendering a filler packet at the expected playback time.

In some embodiments, the audio sync mode is the deterministic mode, and the method further comprises: determining, based at least in part on the timestamp, an expected playback time as measured by the synchronized clock signal; determining that the audio payload will not be available by the expected playback time; constructing the audio payload from error correction data; and rendering the audio payload at the expected playback time.

In some embodiments, the audio sync mode is the semi-isochronous mode, and the method further comprises determining, using the synchronized clock signal, a time of receiving the audio packet; determining, based at least in part on the timestamp, an expected playback time; and rendering the audio payload in response to a determination that the expected playback time has not elapsed. The method can further comprise determining the expected playback time comprises adding a margin time to a staging time, the staging time being the timestamp.

In some embodiments, the audio sync mode is the semi-isochronous mode, and the method further comprises determining, using the synchronized clock signal, a time of receiving the audio packet; determining, based at least in part on the timestamp, an expected playback time; and rendering a filler packet in response to a determination that the expected playback time has elapsed.

In some embodiments, the audio sync mode is the semi-isochronous mode, and the method further comprises determining, using the synchronized clock signal, a time of receiving the audio packet; determining, based at least in part on the timestamp, an expected playback time; constructing the audio payload from error correction data; and rendering the constructed audio payload in response to a determination that the expected playback time has elapsed.

In some embodiments, the method further comprises testing the wireless network to determine a stability of the network and a bandwidth of the network, and the audio sync mode is determined, based at least in part, on the stability of the network and the bandwidth of the network. In some embodiments, the method further comprises correcting a drift of the clock signal by re-synchronizing the clock signal.

In some embodiments, synchronizing the clock signal between the video player and the audio player is performed using one way communication from the video player to the audio player.

Terminology

In the embodiments described above, apparatuses, systems, and methods for multimode synchronous rendering of video and audio are described in connection with particular embodiments. It will be understood, however, that the principles and advantages of the embodiments can be used for any other systems, apparatus, or methods across network devices for the improved synchronization of video and audio. Although certain embodiments are described with reference to a phone, a smart TV, or other particular devices, it will be understood that the principles and advantages described herein can be applied to a variety of devices. While some of the disclosed embodiments may be described with reference to a particular wireless protocol or network, it will be understood that the principles and advantages herein can be applied to a variety of networks and protocols. Moreover, while some equations and timings provided for illustrative purposes, other similar equations or timings can alternatively be implemented to achieve the functionality described herein.

The principles and advantages described herein can be implemented in various devices. Examples of such devices can include, but are not limited to, consumer electronic products, components of the consumer electronic products, electronic test equipment, etc. Components of the electronic devices can also include memory chips, memory modules, circuits of optical networks or other communication networks, and driver circuits. Other examples of devices in a network with audio or video capabilities can include a mobile phone (for example, a smart phone), healthcare monitoring devices, vehicular electronics systems such as automotive electronics systems, a telephone, a television, a computer monitor, a computer, a hand-held computer, a tablet computer, a laptop computer, a personal digital assistant (PDA), a microwave, a refrigerator, a stereo system, a cassette recorder or player, a DVD player, a CD player, a digital video recorder (DVR), a VCR, an MP3 player, a radio, a camcorder, a camera, a digital camera, a portable memory chip, a copier, a facsimile machine, a scanner, a multi-functional peripheral device, a wrist watch, a clock, etc. Further, apparatuses can include unfinished products.

Unless the context clearly requires otherwise, throughout the description and the claims, the words "comprise," "comprising," "include," "including," and the like are to be construed in an inclusive sense, as opposed to an exclusive or exhaustive sense; that is to say, the words should be construed in the sense of "including, but not limited to." The words "coupled" or connected", as generally used herein, refer to two or more elements that can be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number can also include the plural or singular number, respectively. The words "or" in reference to a list of two or more items, is intended to cover all of the following interpretations of the word: any of the items in the list, all of the items in the list, and any combination of the items in the list. All numerical values provided herein are intended to include similar values within a measurement error.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states.

The teachings of the inventions provided herein can be applied to other systems, not necessarily the systems described above. The elements and acts of the various embodiments described above can be combined to provide further embodiments. In variations on the embodiments of the methods described above, some blocks can be omitted, reordered, unordered, or performed in sequence or parallel.

While certain embodiments of the inventions have been described, these embodiments have been presented by way of example only, and are not intended to limit the scope of the disclosure. Indeed, the novel methods and systems described herein can be embodied in a variety of other forms. Furthermore, various omissions, substitutions and changes in the form of the methods and systems described herein can be made without departing from the spirit of the disclosure. The accompanying claims and their equivalents are intended to cover such forms or modifications as would fall within the scope and spirit of the disclosure. The various examples of systems and methods described herein can include many advantages, no single one of which defines the invention. Instead, the invention is defined by the claims.

What is claimed is:

1. A method for selecting a mode of synchronizing audio playback between a first electronic device and a second electronic device, the method comprising:
   receiving, at a first electronic device, video data and audio data, the first electronic device comprising a television or media source coupled with a television;
   wirelessly transmitting clock information associated with the first electronic device through a wireless network to the second electronic device to establish synchronized clocks between the first and second electronic devices, the second electronic device being a mobile device;
   programmatically selecting, using a hardware processor of the first electronic device, an audio synchronization mode based at least in part on the video data, wherein the audio synchronization mode is selected as a semi-isochronous mode comprising compressing the audio data due to the video data being above a threshold in size; and
   transmitting the audio data from the first electronic device to the second electronic device according to the selected audio synchronization mode by at least compressing the audio data to produce compressed audio data, generating forward error correction packets, and transmitting the compressed audio data and the forward error correction packets to the second electronic device.

2. The method of claim 1, further comprising delaying the video data prior to selecting the semi-isochronous mode.

3. The method of claim 1, wherein selecting the audio synchronization mode comprises selecting the semi-isochronous mode in response to detecting a video game in the video data.

4. The method of claim 1, wherein selecting the audio synchronization mode comprises selecting the semi-isochronous mode based on a stability of the wireless network or a bandwidth of the wireless network.

5. The method of claim 1, wherein wirelessly transmitting the clock information comprises wirelessly transmitting a plurality of packets each spaced at approximately equal time intervals.

6. The method of claim 2, further comprising determining a delay time for delaying the video data, said delay time determined based on a buffering capacity of the first electronic device.

7. The method of claim 6, wherein said determining the delay time comprises selecting a delay time longer than an average transmission time for packets to be sent from the first electronic device to the second electronic device.

8. The method of claim 1, wherein synchronizing the clock signal between the video player and the audio player comprises resynchronizing the synchronized clock after a period of audio rendering to account for clock drift.

9. Non-transitory physical electronic storage comprising processor-executable instructions stored thereon that, when executed by a processor, are configured to implement a system for selecting a mode of synchronizing audio playback between a first electronic device and a second electronic device, the system configured to:
receive audio data associated with a video at a first electronic device;
wirelessly transmit clock information associated with the first electronic device through a wireless network to a second electronic device to establish synchronized clocks between the first and second electronic devices;
programmatically select an audio synchronization mode based at least in part on at least one of one or more video characteristics or a stability of the wireless network, wherein the audio synchronization mode is a semi-isochronous mode; and
transmit the audio data from the first electronic device to the second electronic device according to the selected audio synchronization mode by at least compressing the audio data into compressed audio data and providing forward error correction data with the compressed audio data.

10. The non-transitory physical electronic storage of claim 9, wherein the audio compression mode comprises applying lossy compression to the audio data.

11. The non-transitory physical electronic storage of claim 9, wherein the system is further configured to delay data of the video prior to selecting the semi-isochronous mode.

12. The non-transitory physical electronic storage of claim 9, wherein the system selects the audio synchronization mode by at least selecting the semi-isochronous mode in response to detecting a video game in data of the video.

13. The non-transitory physical electronic storage of claim 9, wherein the system selects the audio synchronization mode by at least selecting the semi-isochronous mode based on a bandwidth of the wireless network.

14. The non-transitory physical electronic storage of claim 9, wherein the system is further configured to wirelessly transmit the clock information by at least transmitting a plurality of packets each spaced at approximately equal time intervals.

15. The non-transitory physical electronic storage of claim 14, wherein the system is further configured to determine a delay time for delaying data of the video based on a buffering capacity of the first electronic device.

16. The non-transitory physical electronic storage of claim 15, wherein the system is further configured to determine the delay time by at least selecting a delay time longer than an average transmission time for packets to be sent from the first electronic device to the second electronic device.

17. The non-transitory physical electronic storage of claim 9, wherein the system is further configured to resynchronize the synchronized clocks after a period of audio rendering to account for clock drift.

18. The non-transitory physical electronic storage of claim 9, wherein synchronized clocks between the first and second electronic devices are synchronized without receiving any feedback from the second electronic device.

19. Non-transitory physical electronic storage comprising processor-executable instructions stored thereon that, when executed by a processor, are configured to implement a system for selecting a mode of synchronizing audio playback between a first electronic device and a second electronic device, the system configured to:
receive audio data associated with a video at a first electronic device;
wirelessly transmit clock information associated with the first electronic device through a wireless network to a second electronic device to establish synchronized clocks between the first and second electronic devices;
programmatically select an audio synchronization mode based at least in part on one or more video or network characteristics, wherein the audio synchronization mode is a semi-isochronous mode, and wherein the semi-isochronous mode is selected in response to detecting a video game in data of the video; and
transmit the audio data from the first electronic device to the second electronic device according to the selected audio synchronization mode by at least compressing the audio data into compressed audio data and providing forward error correction data with the compressed audio data.

* * * * *